(12) United States Patent
    Adams, Jr.

(10) Patent No.: US 11,760,425 B2
(45) Date of Patent: Sep. 19, 2023

(54) HANDY HAUL BOX

(71) Applicant: Sidney H Adams, Jr., Ellerslie, GA (US)

(72) Inventor: Sidney H Adams, Jr., Ellerslie, GA (US)

(73) Assignee: Sidney H. Adams, Jr., Ellerslie, GA (US)

( * ) Notice: Subject to any disclaimer, the term of this patent is extended or adjusted under 35 U.S.C. 154(b) by 0 days.

(21) Appl. No.: 17/061,879

(22) Filed: Oct. 2, 2020

(65) Prior Publication Data

US 2022/0105993 A1    Apr. 7, 2022

(51) Int. Cl.
    *B62D 33/02*    (2006.01)
    *B60R 9/06*    (2006.01)

(52) U.S. Cl.
    CPC .......... *B62D 33/0207* (2013.01); *B60R 9/065* (2013.01)

(58) Field of Classification Search
    CPC ......... B60R 9/065; B60R 9/055; B65D 19/12; B65D 88/121; B65D 2519/00512; B65D 2519/00532; B65D 7/08; B62D 33/0207
    USPC ............... 224/403, 404, 457, 524, 526, 527; 296/37.6; D12/414.1; 220/668, 4.28
    See application file for complete search history.

(56) References Cited

U.S. PATENT DOCUMENTS

| | | | | |
|---|---|---|---|---|
| 2,688,420 A * | 9/1954 | Bishop | ...................... | B65D 7/08 220/668 |
| 3,105,617 A * | 10/1963 | Felldin | ................ | B65D 77/061 222/181.3 |
| 4,212,406 A * | 7/1980 | Mittelmann | ........... | B65D 88/14 220/1.5 |
| 4,625,880 A * | 12/1986 | Pym | ...................... | B65D 88/528 220/1.5 |
| 4,830,211 A | 5/1989 | Mekhan | | |
| 4,830,242 A * | 5/1989 | Painter | ...................... | B60P 3/32 224/404 |
| 5,033,662 A * | 7/1991 | Godin | ..................... | B60R 9/065 224/521 |
| 5,595,305 A | 1/1997 | Hart | | |
| 5,934,725 A * | 8/1999 | Bowers | ..................... | B60P 3/40 296/26.09 |
| 6,024,263 A * | 2/2000 | Lewis, Sr | ................. | B60R 9/06 224/502 |
| 6,318,781 B1 * | 11/2001 | Mc Kee | .................... | B60R 9/00 296/26.09 |
| 6,422,627 B1 * | 7/2002 | Kuhn | ........................ | B60P 3/40 296/26.1 |
| 6,467,830 B1 * | 10/2002 | Cortright | ................ | B60R 13/06 296/26.04 |

(Continued)

*Primary Examiner* — Justin M Larson

(57) ABSTRACT

A large haul box for use in a pickup or trailer is disclosed. The large haul box includes a pair of long side wall having a top side, a bottom side, an open end and a back end, a back wall coupled between the back ends of the pair of long side walls, a bottom surface coupled to the back wall along a short end and coupled to the pair of long side walls on their bottom sides, a bottom sheathing coupled to the bottom surface, a long side sheathing coupled to each of the pair of long side walls, a back sheathing coupled to the back wall, and a removable box end having a top side, a bottom side, and a pair of short sides between the top and bottom sides for coupling to the open ends of the pair of long side walls along the pair of short sides and oriented to have the bottom side of the removable box end couple to the open end of the bottom surface.

10 Claims, 3 Drawing Sheets

(56) References Cited

U.S. PATENT DOCUMENTS

| | | | | |
|---|---|---|---|---|
| 6,536,640 | B1 * | 3/2003 | Gent | B60R 9/00 |
| | | | | 224/403 |
| 6,543,659 | B2 * | 4/2003 | Blair | B60R 9/045 |
| | | | | 220/9.2 |
| 6,712,248 | B2 * | 3/2004 | Mitchell | B60R 9/06 |
| | | | | 224/498 |
| 6,845,895 | B2 * | 1/2005 | Jones | B60R 9/065 |
| | | | | 224/328 |
| 6,860,536 | B1 * | 3/2005 | Schimunek | B60P 1/003 |
| | | | | 296/26.09 |
| 7,004,365 | B2 * | 2/2006 | Ingram | B60R 7/14 |
| | | | | 220/23.91 |
| D577,328 | S * | 9/2008 | Vrbas | D12/414.1 |
| 9,623,808 | B2 * | 4/2017 | Bonenberger | B60K 2016/003 |
| 9,783,129 | B2 | 10/2017 | Roach | |
| 10,793,078 | B2 * | 10/2020 | Schuling | B60R 9/065 |
| 11,124,247 | B2 * | 9/2021 | Sosnowich | B60R 9/06 |
| 2006/0182580 | A1 | 8/2006 | Petersen | |
| 2006/0186157 | A1 * | 8/2006 | Dibble | B60R 9/12 |
| | | | | 224/405 |
| 2009/0032530 | A1 * | 2/2009 | Chu | B65D 88/528 |
| | | | | 220/4.28 |
| 2014/0305977 | A1 * | 10/2014 | Sparks | B60P 1/6427 |
| | | | | 224/404 |

* cited by examiner

HANDY HAUL BOX

TECHNICAL FIELD

This application relates in general to an article of manufacture providing movable storage, and more specifically, to an article of manufacture providing a larger or small haul box for use in a pickup or trailer.

BACKGROUND

There are trailers available with dump beds, dump trucks, back hoes, and front end loaders which require a person to use a tarp to load and unload. This task can be very tedious, time consuming, and messy. The pile of material remains in the location where you unloaded it until the project is completed and can be very unsightly. The Handy Haul Box, however, sits on your trailer or truck bed and you unload your material with ease by opening the vertical slide gate or single swing hinged gate and loading a wheelbarrow with no problem. Afterward, the material can be stored securely in the Handy Haul Box so that material does not remain in sight on the site.

Many landscaping techs deal with homeowners who do not want a pile of materials in their driveways or in front of their homes, or there may be limited workspace. The Handy Haul Box keeps the job neat and clean, as well as eliminates extra delivery costs. Landscaping companies or lawn technicians would love this convenient tool for flower bed restorations and small projects to complete with ease.

Additionally, whenever a person is laying sod and requires extra dirt or topsoil, they typically purchase the topsoil by the bag or by the truck load. If a person is restoring or creating a flower bed which may require rocks, gravel, or the like, purchasing these items by the bag will be costly and more expensive than having a truck load of material delivered. Requesting these items to be delivered by truck will add cost and time to the project with assurance that there will be no problems with the delivery. Companies are often behind on deliveries and there are additional delivery charges to locations outside the free delivery area.

Therefore, a need exists for an article of manufacture providing a larger haul box for use in a pickup or trailer according to the present invention. The present invention attempts to address the limitations and deficiencies of prior solutions according the principles and example embodiments disclosed herein.

SUMMARY

In accordance with the present invention, the above and other problems are solved by providing an article of manufacture for a larger haul box for use in a pickup or trailer according to the principles and example embodiments disclosed herein.

In one embodiment, the present invention is an article of manufacture for providing a larger haul box for use in a pickup or trailer. The large haul box includes a pair of long side wall having a top side, a bottom side, an open end and a back end, a back wall coupled between the back ends of the pair of long side walls, a bottom surface coupled to the back wall along a short end and coupled to the pair of long side walls on their bottom sides, a bottom sheathing coupled to the bottom surface, a long side sheathing coupled to each of the pair of long side walls, a back sheathing coupled to the back wall, and a removable box end having a top side, a bottom side, and a pair of short sides between the top and bottom sides for coupling to the open ends of the pair of long side walls along the pair of short sides and oriented to have the bottom side of the removable box end couple to the open end of the bottom surface. Each long side wall comprising a pair of long members and a plurality of short members coupled between the pair of long support members. The back wall comprises a top side support member, a bottom side support member, and a plurality of short members coupled between the top and bottom side support members. The bottom surface comprising a bottom pair of long members and a center long member, each of which is coupled to the bottom side support members of the pair of long side walls. The removable box end comprises a pair of end support members and a plurality of short support members between the pair of end support members.

In another aspect of the present disclosure, the removable box end engages an attachment groove along the open end of the pair of long sides and is secured by a pair of attachment bolts being threaded through the attachment grooves and through the removable box end.

In another aspect of the present disclosure, the removable end further comprises a removable end sheathing coupled to an inner side.

In another aspect of the present disclosure, the bottom sheathing, long side sheathing, back sheathing, and removable end sheathing are made of 16 gauge diamond plated aluminum.

In another aspect of the present disclosure, the long support members, the plurality of short support members, top and bottom side support members, and the end support members being made of 16 gauge 1" by 1" tube steel.

In another aspect of the present disclosure, the top sides of the long side walls further comprise a plurality of side attachment points for securing the article to a truck bed and a trailer.

In another aspect of the present disclosure, the top side support member of the back wall comprises a pair of eyehooks for securing the article to a truck bed and a trailer.

In another aspect of the present disclosure, the long side walls are 8 feet long by 14" high and the back wall is 4 foot long by 14" high.

In another aspect of the present disclosure, the long side walls are 7 feet long by 12" high and the back wall is 3 foot long by 12" high.

In another aspect of the present disclosure, the bottom surface is 8 feet long by 4 feet wide.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
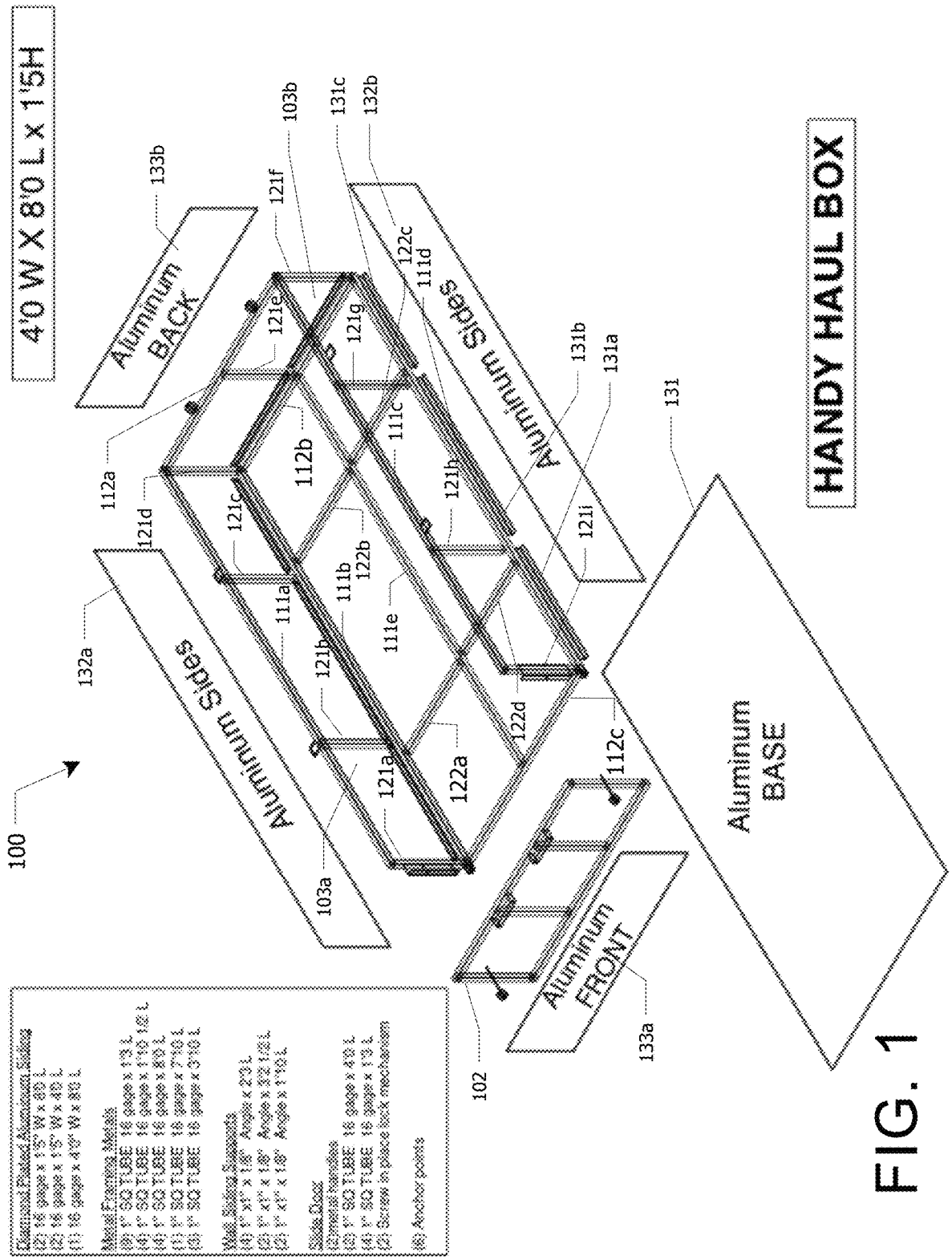
FIG. 1 illustrates an example embodiment of an article of manufacture for providing a larger haul box for use in a pickup or trailer according to the present invention.

This application relates in general to an article of manufacture for providing movable storage, and more specifically, to an article of manufacture for providing a larger haul box for use in a pickup or trailer according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "worker," and "user" refer to an entity, e.g. a human, using the Handy Haul Box associated with the invention. The term user herein refers to one or more users.

The term "invention" or "present invention" refers to the invention being applied for via the patent application with the title "Handy Haul Box." Invention may be used interchangeably with box.

In general, the present disclosure relates to an article of manufacture for providing movable storage. To better understand the present invention, FIG. 1 illustrates an example embodiment of an article of manufacture providing a larger haul box for use in a pickup or trailer according to the present invention.

Figure 2:
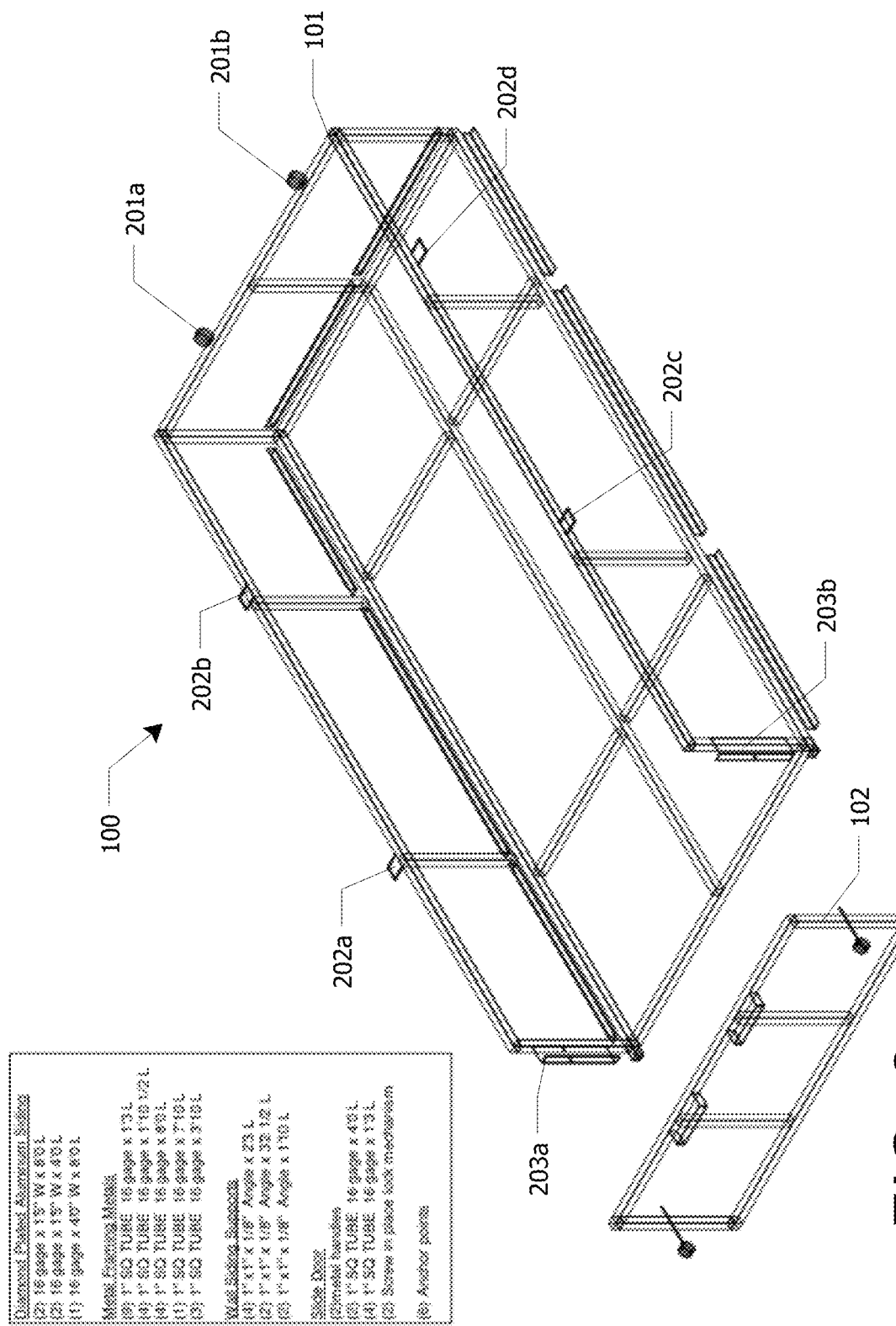
FIG. 2 illustrates another example embodiment of an article of manufacture for providing a larger haul box for use in a pickup or trailer according to the present invention.

The Handy Haul Box 100 is made of light gauge metal material which has been welded together and light gage diamond plated aluminum siding to enclose the framing with a double gate access for unloading along with four anchor points. The Handy Haul Box 100 is 14" tall by 4'0 wide by 8'0 long, as shown in FIGS. 1-2, also available in a smaller size-12" tall by 3'0 wide by 7'0 long (not shown) which will accommodate any pickup truck bed or trailer.

The Handy Haul Box 100 has a multi-purpose use for assisting in transporting rocks, sand, dirt, or even sensitive items. This item will primarily be used by homeowners, landscaping companies, and lawn services that utilize a pick-up truck or trailer to pick up a ½ to 1 yard of rock, sand, dirt, etc. Use of the Handy Haul Box 100 will eliminate the delivery fees and save time.

The first embodiment was made of untreated wood with 2'×4' and ¾" plywood. After some experimental use, the first embodiment was determined to be too heavy for one person to load onto a trailer. After 6 loads of 1 yard of river rocks (about 2600 lbs.), stress on the walls of the box 100 began to show, and anchoring and securing the box 100 to the trailer was also putting stress on the box.

The second embodiment is made of 16 gauge 1"×1" tube steel. This box 100 is lighter and more rigid. The box 100 will not have the stress damage of the first embodiment and will keep its integrity even when anchored down with industrial rigging equipment. The second embodiment may be loaded onto a pickup or trailer by one person.

The Third embodiment is made of welded light gage material and light gage aluminum siding (plywood sheathing was removed after observing that the weather elements will shorten the life of the material). The light gage Diamond Plated Aluminum base and siding solidifies the Handy Haul Box will help the longevity and endure the harsh weather conditions. Also, the side supports were added to fortify the side walls to the base of the frame which will overall makes the Handy Haul Box more rigid.

The Handy Haul Box 100 may be constructed with a box frame 101 and a removable box end 102. Both of these items may be coupled to solid side material, for example plywood to create an enclosed box capable of holding yard material. Other material, such as steel or aluminum, also may be used as long as the material is strong enough to support the weight of the yard material hauled in the box.

The box frame 101 comprises a plurality of long support members 111*a-e* that are used for the top and bottom supports of the Handy Haul Box 100. On each side of the box 100 a pair of long support members 111*a-b* and 111*c-d* are connected by a plurality of short support members 121*a-d* and 121*f-i* to define the two long side walls 103*a-b* of the box 100. These two sides are covered by siding material 132a-b. The aluminum siding has side wall supports which is made from ⅛" thick 1" by 1" metal angle. These supports reinforce and strengthens the walls by adjoining the aluminum siding material to the main frame or the base.

A back wall 104 may be constructed using a pair of side support members 112a-b connected by a set of additional short support members 121d-121f. Each of the two ends of the back wall 104 are coupled to one of two ends of the pair of long side walls 103a-b of the box 100. The back wall 104 also may be covered by siding material 133b.

One additional long support member 111e is connected to the center of the bottom short support member 112b and oriented to run parallel to the two long side walls 103a-b. A set of base support members 122a-d connect the additional long support member 111e to the two bottom support members 111b, 111d of the two long side walls 103a-b to form a base or bottom of the box 100. Siding material 131 covers these base support members forming an enclosed box 100 with the two long side walls 103a-b and the back wall 104. A removable box end 102 attaches to an open end of the box where the removable box end 102 couples to the ends of the long side walls 103a-b. A set of base support rails 131a-c are shown along a bottom outer edge of the box 100 at the bottom of the second side wall 103b. An identical set of support rails (not shown) are located along a bottom outer edge of the box 100 at the bottom of the first side wall 103a.

All of the above support members may be coupled together by welding the ends together in the arrangement shown in FIG. 1 for a preferred embodiment for a box 100 made of tube steel. Other embodiments may connect the support members using mechanical attachment devices such as nuts and bolts, screws, and related hardware components. For an embodiment in which the support members are made of wood, nails may be used.

In order to maintain and keep up the Handy Haul Box 100, users may clean the Handy Haul Box outside on a moderate day, use a mild soap and water to wash and remove any mud and grease, spray or rinse off with a hose, mix one-part acid to one-part water, such as a cup of vinegar to a cup of water, or use cream of tartar or lemon juice, and use for cleaning. Alternatively, a user may use a metal-polish paste to scrub the furniture in place of the mild acid solution. The Handy Haul Box 100 is scrubbed with the above solution. A gentle dish scrubber may be useful for the cleaning process, to prevent to damage the metal with scratches. Users are trying to remove the discoloration due to oxidation.

The Handy Haul Box 101 may be used with one of more accessories, such as sectional dividers, tarps, hard covers, skid resistance Matting, team logos, and rigging (not shown). Additionally, Forklift Skids may also be mounted onto the Handy Haul Box 101 as needed. Other useful items that may be used with the Handy Haul Box 101 include shackles, chain come alongs, I-bolts, leveling hoists, punching straps, and ratcheting straps among other similar items.

Oxidation is why aluminum doesn't rust. Though oxidation is a form of corrosion, it forms aluminum oxide, which creates a hard, protective barrier that shields the metal from water. However, it does build up over time, and the discoloration lessens the beauty of the Handy Haul Box. Once complete, Rinse off the solution with a hose.

FIG. 2 illustrates another example embodiment of an article of manufacture for providing a larger haul box for use in a pickup or trailer according to the present invention. The Handy Haul Box 100 is shown having a pair of eye hook attachments 201a-b along the top edge of the back wall 104. These eye hooks may be used to tie down the box to a trailer or pickup bed when hauling items to a job site. A plurality of side attachment points 202a-d are located along the top edge of the pair of long side walls 103a-b to assist in restraining the box when on a trailer or pickup bed. In a preferred embodiment, the side attachment points 202a-d are positioned above a short support member used 121b-c and 121g-h to create the long side walls 103a-b.

The removable box end 102 attaches to the open end of the box 100 by sliding into a pair of attachment grooves 203a-b attached to the sides of the long side walls 103a-b at the open end of the box 100. The removable box end 102 slides downward into the attachment grooves 203a-b with a pair of shorter ends of the removable box end 102 fitting within the grooves 203a-b. A pair of attachment bolts 301a-b couple the sides of the removable box end 102 to the open end of the box 100 as the attachment bolts are threaded through holes in the sidewalls of the attachment grooves 203a-b after pass through the removable box end 102.

There are six anchor points on the Handy Haul Box that can be used to secure the box while being transported. I-bolts boles are provided on the frame 112a, 111c and 111a. The holes at 201a,201b, 202b, 202a, 202c and 202d are provided for I-bolt rigging (recommended with shackle use). Also, leveler hoists, ratchet straps, chain come-along, proper roping and tow chains can be used to secure the Handy Haul Box to the truck bed or trailer. A skid resistant felt can be placed under the Handy Haul Box in line with proper rigging to ensure zero movement of box while transporting a load.

Figure 3:
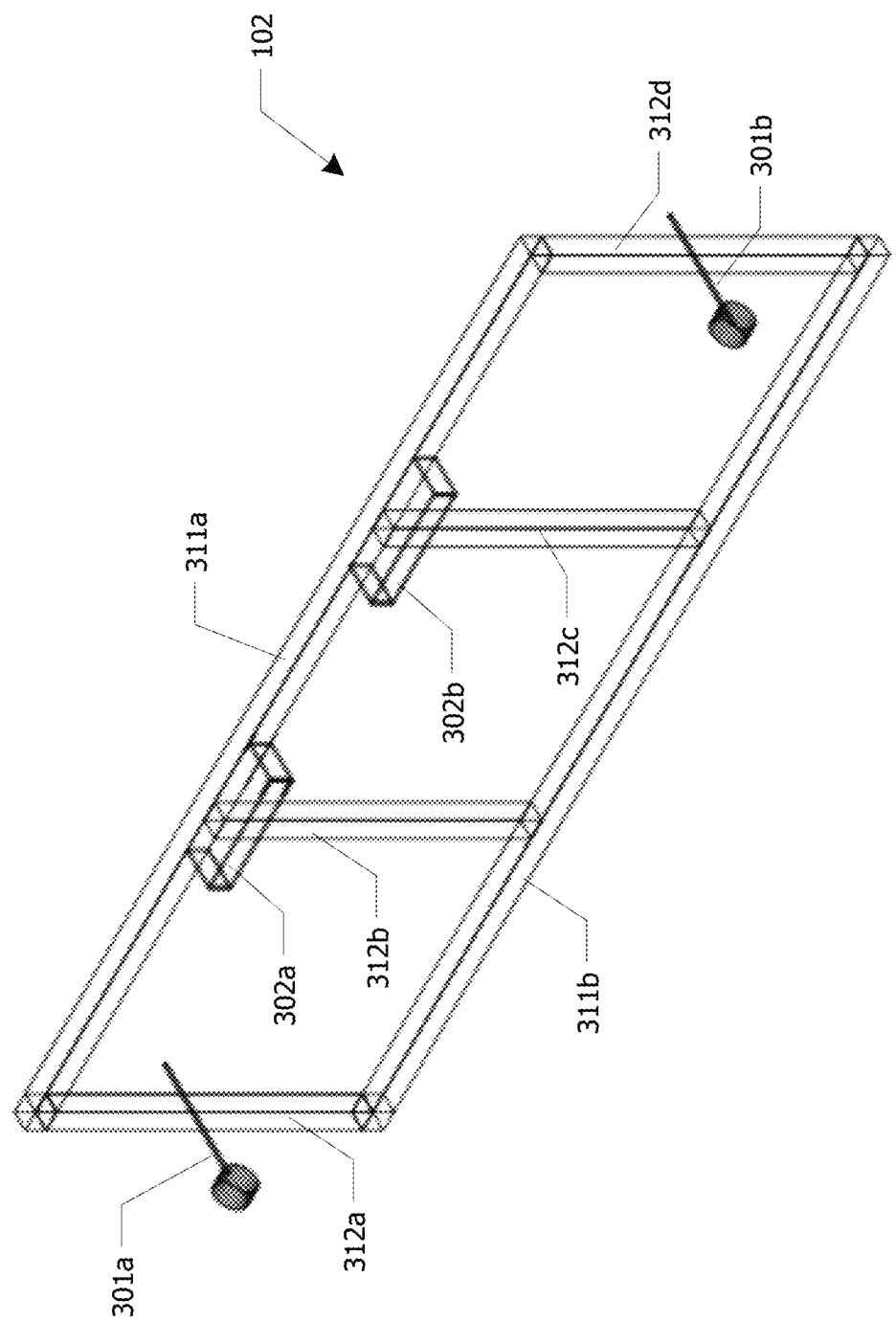
FIG. 3 illustrates an example embodiment of an article of manufacture for providing a removable haul box end for use in a pickup or trailer according to the present invention.

FIG. 3 illustrates an example embodiment of an article of manufacture providing a removable haul box end for use in a pickup or trailer according to the present invention. The removable box end 102 comprises a pair of side support members 311a-b that are connected together with opposing ends of a plurality of short support members 312a-d coupled to the sides of the side support members 311a-b. A pair of handles 302a-b are coupled along the top edge of the removable box end 102 for lifting the removable box end 102 out of the attachment grooves 203a-b along the open end of the box 100. As shown in FIG. 1, siding material 133a may be attached to the sides of the removable box end 102 to complete the enclosure of the box 100 when installed into the attachment grooves 203a-b. The pair of attachment bolts 301a-b may be located through the short support members 312a, 312d that define the outer edge of the removable box end 102.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. An article of manufacture for providing a haul box for use in a pickup or trailer, the haul box comprises:
   a pair of long side walls having a top side, a bottom side, an open end and a back end, each long side wall comprising a pair of long members and a plurality of short members coupled between the pair of long support members;

a back wall coupled between the back ends of the pair of long side walls, the back wall comprises a top side support member, a bottom side support member, and a plurality of short members coupled between the top and bottom side support members;

a bottom surface coupled to the back wall along a short end and coupled to the pair of long side walls on their bottom sides, the bottom surface comprising a pair of base support members, each of which is coupled to the long members of the pair of long side walls, and a center long member;

a bottom sheathing coupled to the bottom surface;

a long side sheathing coupled to each of the pair of long side walls;

a back sheathing coupled to the back wall; and a removable box end having a top side, a bottom side, and a pair of short sides between the top and bottom sides for coupling to the open ends of the pair of long side walls along the pair of short sides and oriented to have the bottom side of the removable box end couple to an open end of the bottom surface, the removable box end comprises a pair of end support members and a plurality of short support members between the pair of end support members.

2. The haul box according to claim 1, wherein the removable box end engages an attachment groove along each open end of the pair of long sides and is secured by a pair of attachment bolts being threaded through the attachment grooves and through the removable box end.

3. The haul box according to claim 2, wherein the removable end further comprises a removable end sheathing coupled to an inner side.

4. The haul box to claim 3, wherein the bottom sheathing, long side sheathing, back sheathing, and removable end sheathing are made of $1/8$" thick 1" by 1" metal angle.

5. The haul box according to claim 3, wherein the long members, the plurality of short members, top and bottom side members, and the end members being made of 16 gauge 1" by 1" tube steel.

6. The haul box according to claim 5, wherein the top sides of the long side walls further comprise a plurality of side attachment points for securing the article to a truck bed and a trailer.

7. The haul box according to claim 5, wherein the top side support member of the back wall comprises a pair of eyehooks for securing the article to a truck bed and a trailer.

8. The haul box according to claim 1, wherein the long side walls are 8 feet long by 14" high and the back wall is 4 foot long by 14" high.

9. The haul box according to claim 1, wherein the long side walls are 7 feet long by 12" high and the back wall is 3 foot long by 12" high.

10. The haul box according to claim 8, wherein the bottom surface is 8 feet long by 4 feet wide.

* * * * *